June 22, 1943. C. W. CLARK 2,322,348
PROCESS FOR RECOVERING SELENIUM AS SELENIUM
DIOXIDE FROM COPPER REFINERY SLIMES
Filed March 26, 1941
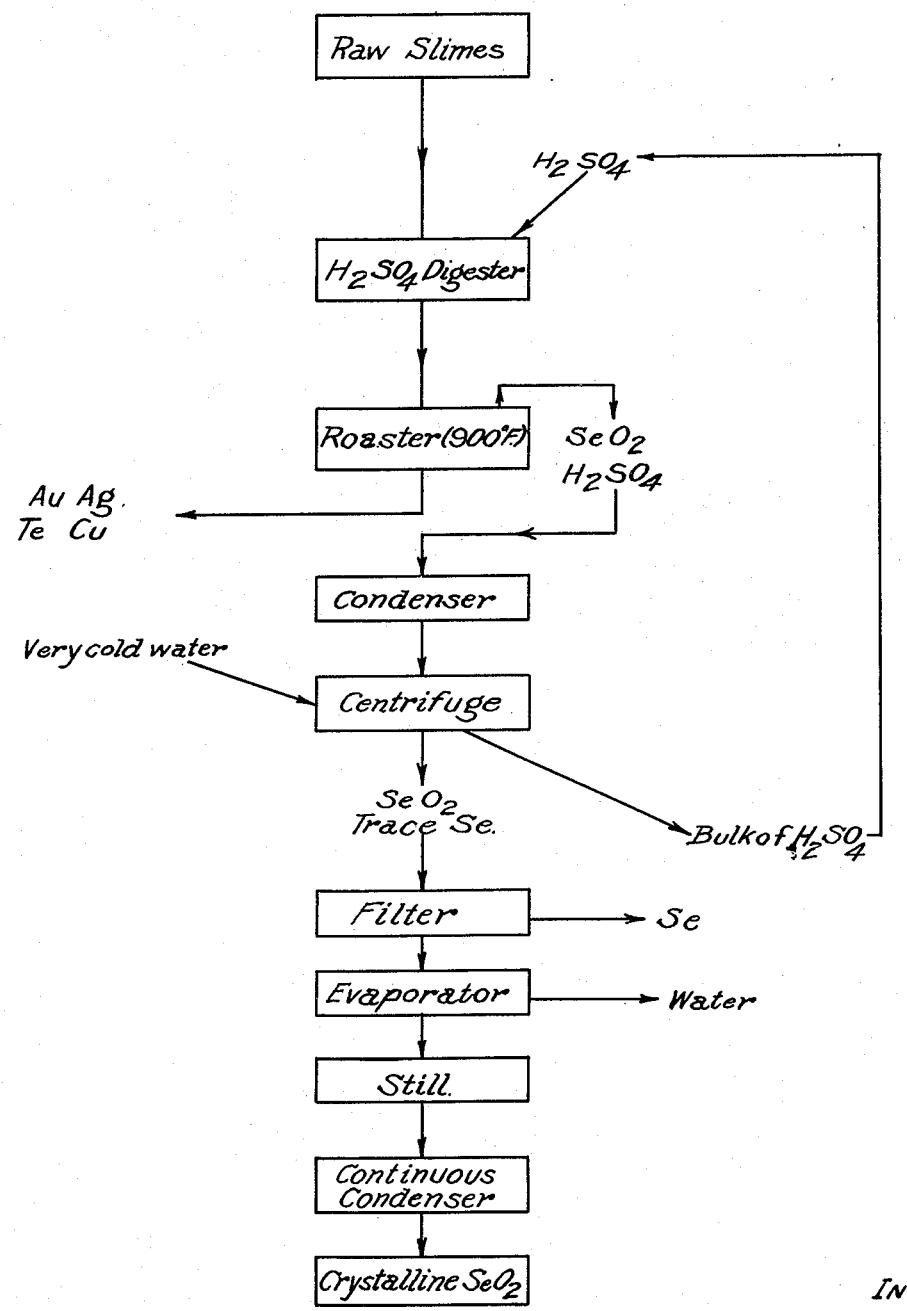
INVENTOR
CHARLES W. CLARK
Smart & Biggar
BY
ATTORNEYS.

Patented June 22, 1943

2,322,348

UNITED STATES PATENT OFFICE 2,322,348

PROCESS FOR RECOVERING SELENIUM AS SELENIUM DIOXIDE FROM COPPER REFINERY SLIMES

Charles W. Clark, Montreal, Quebec, Canada, assignor to Canadian Copper Refiners Limited, Montreal East, Quebec, Canada, a corporation Application March 26, 1941, Serial No. 385,290

4 Claims. (Cl. 23—139)

The present invention relates to a process for recovering selenium as selenium dioxide from copper refinery slimes.

Slimes from the electrolytic refining of copper consist according to the copper which is being refined, of copper in the form of insoluble metallic copper, gold, silver, selenium and tellurium. In the assay of such slimes the proportion of copper is greater than the proportion of the other constituents. Its presence and its large proportion make its removal of prime importance.

In the known methods of treating slimes, the copper is removed:

1. By drying the concentrated slimes and acid roasting the dried slimes with sulphuric acid to convert the copper into water soluble copper sulphate which is leached from the roasted slimes and the copper is recovered by treating this sulphate solution electrolytically.

2. The slimes are air roasted to oxidize the copper to CuO and the oxidized slimes treated with dilute sulphuric acid to remove the copper, and the copper recovered by electrolysis.

3. By aerating the raw slimes in dilute sulphuric acid to remove the copper as copper sulphate, and the copper recovered by electrolysis.

In all these methods the bulk of the selenium is left in the raw slimes and necessitates considerable treatment in the subsequent Dore furnace operations to remove this residual selenium. This selenium is removed by treating the molten slimes with sodium carbonate and sodium nitrate which form slags containing sodium selenite. These slags are subsequently dissolved in water, neutralized with sulphuric acid to precipitate the tellurium. The tellurium is filtered off as tellurium dioxide. The solution containing the selenium is then acidified with sulphuric acid and the selenium precipitated in the usual manner, i. e., by sulphur dioxide gas. During the roasting operation described above and the Dore furnace operation some selenium is volatilized as elemental selenium and selenium dioxide into the flues and scrubbers. The flue dusts containing selenium are usually so impure that these dusts are reprocessed through the Dore furnace. The selenium in the scrubber solutions is combined with that selenium in the slag solutions.

The selenium recovery method outlined above is, in its essentials and insofar as it concerns the form in which the selenium is delivered, general for all slime treatments where selenium is recovered. This is true whether the slimes are roasted to remove the copper or whether the copper is removed by aeration in acid solution as is sometimes the case. While such a treatment of refinery slimes is satisfactory from the point of view of the separation of copper and the recovery of gold, silver and tellurium, the recovery of selenium in this way has several disadvantages mainly associated with the fact that the selenium finally appears free and uncombined. For instance, selenium finds industrial application in the form of its oxide as an accelerator for chemical reactions. Selenium dioxide is also a strong oxidizing agent and is used as such with quick drying oils. Even where selenium itself is used in alternating current rectifiers, it has been found that if the selenium is freshly prepared, just before the rectifier is made, improved results are obtained. Consequently rectifier manufacturers prefer to purchase the oxide and prepare the pure selenium as it is required.

To meet these and other industrial requirements it has been necessary to resort to a costly oxidation of the pure selenium using nitric acid to give selenium dioxide.

The present invention is a process which permits the recovery of selenium from electrolytic copper refinery slimes as selenium dioxide and eliminates the costly oxidation of selenium to selenium dioxide without disturbing the method of recovering the other constituents.

According to the invention the slimes from the electrolytic cells are digested until substantially all the selenium has been converted to selenious acid and the copper to a water soluble copper compound. Sulphuric acid, preferably of about 60° Be. and about 75% of the dry weight of the slimes is suitable for this purpose. When the selenium is substantially completely converted to selenious acid and the copper is also completely converted, the slimes are roasted to change the selenious acid to selenium dioxide and vaporize the latter and any excess acid.

The preliminary digesting of the slimes with sulphuric acid makes it possible to eliminate 97% to 98% of the selenium when the slimes are roasted. The selenium goes off in the flue gas of the roaster the greater part being in the form of the oxide. The roasted slimes contain copper as soluble copper sulphate so that the recovery of the remaining elements can be carried on in any usual manner.

It has the further advantage that acid does not have to be supplied while the slimes are being roasted. Usually this is done by spraying. The sprays very often become clogged and often too, the rabbling cannot be sufficiently vigorous to ensure an even and thorough action of the acid.

Digesting the slimes before roasting eliminates spraying and permits control of the action of the acid so that the conversion of copper to soluble sulphate and selenium to selenium dioxide is as complete as possible.

The drawing shows a flow sheet of the various steps in the process.

Referring to the flow sheet the raw slimes from the copper refinery tank house are concentrated and dried in any suitable manner.

The dried slimes are then digested with sufficient sulphuric acid to complete all the reactions until all the copper has been converted to copper sulphate and the selenium to selenious acid. Digestion is carried on with continuous stirring and the acid and slimes are warmed preferably to a temperature of about 400° F. The process of the digestion can be followed by the colour changes which take place and is carried on until the black slimes turn to a brownish chocolate colour. The time required for the completion of this step depends a great deal on the content of the slime. If the copper and selenium content are high, the digestion time may require from four to six hours. If the selenium and copper content are normal, the digestion time required is from two to four hours.

The digested slimes are then roasted in a suitable furnace, the charge preferably being heated indirectly. Roasting is carried out at a temperature slightly above 700° F. and preferably below 800° F. so that the selenious acid is changed to selenium dioxide, volatilized and driven off in the flue gases with the sulphuric acid. It has been found that the best results are obtained at a temperature slightly above 700° F., although it is possible to go up to 800° F. without affecting the purity of the final product. However, beyond this temperature, impurities which may be in the crude selenium dioxide may be carried over and would require redistillation.

The gases from the roasting operation are passed through a condenser where the selenium dioxide, sulphuric acid and a trace of selenium are condensed.

The sulphuric acid must next be removed from the selenium dioxide and the trace of selenium. This is conveniently done by centrifuging for about 30 minutes and then washing what remains in the centrifuge quickly with cold water to remove the bulk of the acid. Selenium dioxide is quite readily soluble in warm water and therefore care must be taken that the washing is carried out quickly and that the temperature of the water does not exceed 80° F. Even with these precautions some selenium dioxide is carried away with the acid. However, this acid is reused in the digestion of the raw slimes so that the selenium content is not lost.

The separated selenium dioxide is then dissolved in water and filtered to remove from it the traces of pure selenium which are returned to the process to be digested. The filtrate which still contains some acid and traces of tellurium is evaporated and the dried selenium dioxide is distilled and condensed.

Before evaporation inhibitors are added to ensure that in subsequent distillation, the tellurium and acid are not vaporized and condensed with the selenium dioxide. The inhibitor or inhibitors used should be such as to form with tellurium and sulphuric acid, compounds which vaporize at temperatures sufficiently above the vaporization temperature of selenium dioxide so that the latter can be vaporized without danger of carrying the other compounds with it. For this purpose sodium hydroxide is useful since it forms with the acid and tellurium, sodium sulphate and sodium telluride respectively and allows the carrying on of the distillation at temperatures above 700° F.

The vapours from the still are condensed preferably in a continuous condenser which will permit condensed selenium dioxide being scraped from the walls as it is formed. Otherwise selenium dioxide which is a poor conductor of heat will reduce the efficiency of the condenser as the condensate forms.

I claim:

1. A process for treating slimes from the electrolytic refining of copper to recover selenium as selenium dioxide which comprises digesting the slimes with sulphuric acid at about 400° F. without distillation of the selenium to convert substantially the whole selenium content into selenious acid, then roasting the digested slimes to drive off the selenium as volatile selenium dioxide substantially without any free selenium and condensing the vapours from the roasting operation.

2. A process for treating slimes from the electrolytic refining of copper to recover selenium as selenium dioxide as defined in claim 1 in which the slimes are digested with sulphuric acid and the roasting is at a temperature between 700° F. and 800° F.

3. The process as claimed in claim 1 in which the condensed vapours are purified by separating mechanically a large part of the acid, treating the remaining mixture with water to dissolve selenium dioxide, filtering the solution so formed and evaporating to dryness.

4. A process for treating slimes from the electrolytic refining of copper to recover selenium as selenium dioxide which comprises digesting the slimes with sulphuric acid at about 400° F. without distillation of selenium to oxidize the selenium content, roasting the digested slimes to drive off sulphuric acid and selenium as selenium dioxide, condensing the sulphuric acid and selenium dioxide, mechanically separating the bulk of the sulphuric acid from the selenium dioxide, treating the remaining mixture with water to dissolve selenium dioxide, adding an inhibitor to the solution adapted to inhibit the vaporization of tellurium and being of such form as to form a compound with tellurium and sulphuric acid which vaporizes above the vaporizing temperature of selenium dioxide, filtering the solution, evaporating the solution to dryness and distilling at a temperature above 700° F.

CHARLES W. CLARK.